United States Patent [19]

Helm et al.

[11] 4,156,292

[45] May 29, 1979

[54] DISPLAY CARRYING AND PROTECTIVE HELMET

[75] Inventors: David P. Helm, Burke; William S. Flogaus, Alexandria, both of Va.

[73] Assignee: The United States of America as represented by the Secretary of the Army, Washington, D.C.

[21] Appl. No.: 908,872

[22] Filed: May 23, 1978

[51] Int. Cl.² ............................ A42B 3/02; F41H 1/04
[52] U.S. Cl. ............................................ 2/6; 350/145; 350/298
[58] Field of Search .................. 2/6, 422, 426, 438, 2/441; 350/98, 145, 248, 298; 351/155, 156

[56] References Cited

U.S. PATENT DOCUMENTS

| Re. 28,847 | 6/1976 | Vizenor | 350/298 X |
|---|---|---|---|
| 3,059,519 | 10/1962 | Stanton | 2/6 X |
| 3,170,979 | 2/1965 | Baldwin et al. | 350/298 X |
| 3,205,303 | 9/1965 | Bradley | 2/6 X |
| 3,833,300 | 9/1974 | Rymes | 350/145 X |
| 3,923,370 | 12/1975 | Mostrom | 350/298 X |
| 4,040,744 | 8/1977 | Schertz et al. | 350/298 X |
| 4,081,209 | 3/1978 | Heller | 350/298 X |

*Primary Examiner*—Louis Rimrodt
*Attorney, Agent, or Firm*—Nathan Edelberg; Milton W. Lee; Aubrey J. Dunn

[57] ABSTRACT

A helmet capable of providing head protection and of carrying various accessories. The helmet includes a form-fit inner liner combined with a transparent mask, and an outer shell. The outer shell has a mount by which a display device may be carried. The display device has a flanged ocular end which snaps into a groove formed in the mask. The display device is carried on the mounts by a swivel-mount quick-disconnector. The outer shell may also carry such things as a visor and a radio microphone. The inner liner may carry earphones and may be adapted to connect to a gas mask.

7 Claims, 5 Drawing Figures

DISPLAY CARRYING AND PROTECTIVE HELMET

The invention described herein may be manufactured, used, and licensed by the U.S. Government for governmental purposes without the payment of any royalties thereon.

BACKGROUND OF THE INVENTION

This invention is in the field of military aviation helmets. Such helmets normally are designed to provide head protection to the wearer and to carry such gear as radio microphones and sun visors. Lately, helmets have been required to act as a mount for ancillary equipment in addition to the usual gear. An example of such equipment is the helmet-mounted dispaly (HMD) wherein an image may be carried to the eye of the helmet wearer. The image is usually formed by a small cathode ray tube. Unfortunately, the head protection feature and HMD carrying capabilities of a helmet have mutually exclusive requirements. Specifically, for best head protection, a helmet with a relatively loose and hard outer shell over a soft inner liner is desirable, but for best image viewing the HMD must be stationary with respect to the viewer'eye. The instant invention is able to meet both requirements by having one end of the HMD mounted to a loose helmet outer shell, and with the ocular end of the HMD affixed to a transparent mask carried by an inner helmet liner form-fitted to the wearer'head.

BRIEF SUMMARY OF THE INVENTION

The invention is a helmet system for providing head protection and for carrying various ancillary equipment. The system includes a form-fit inner helmet liner with an integral face mask, and an outer helmet shell loosely carried on said liner. The outer shell has a quick-disconnect mount for a helmet-mounted display having a support end and an ocular end. The ocular end snaps into an adapter on the face mask, and the support end is carried by an adjustable swivel joint on the mount.

DETAILED DESCRIPTION OF THE INVENTION

Figure 1:
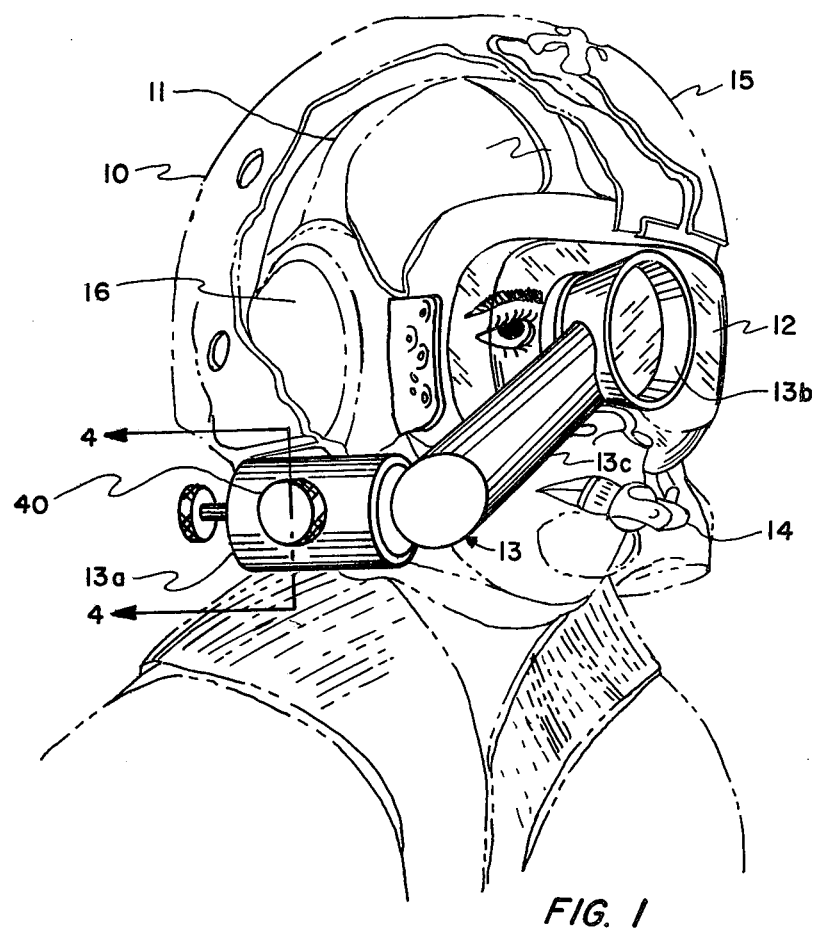
FIG. 1 shows a pictoral view of the invention.

This invention may perhaps be best understood by referring to the drawings, in which FIG. 1 shows a helmet made in accordance with the invention worn by a helicopter pilot or crewman or the like. The helmet includes an outer shell 10 and an inner form-fit liner. The shell may be supported in the usual manner by straps or foam rubber pads (neither shown) on the liner. The liner is individually fitted to its wearer and includes straps such as 11, and mask 12. The liner may be secured to the wearer's head by Velco fasteners, or snaps, or the equivalent (none shown). Outer shell 10 has mounted thereon helmet-mounted display (HMD) 13 having support end 13a ocular end 13b, and connecting tube 13c therebetween. The shell may also support such things as mike boom 14 and visor 15. Also, liner 11 may have earphones such as 16 integral therewith. Knob 40 is for locking 13 onto 10, as will be further explained.

Figure 2:
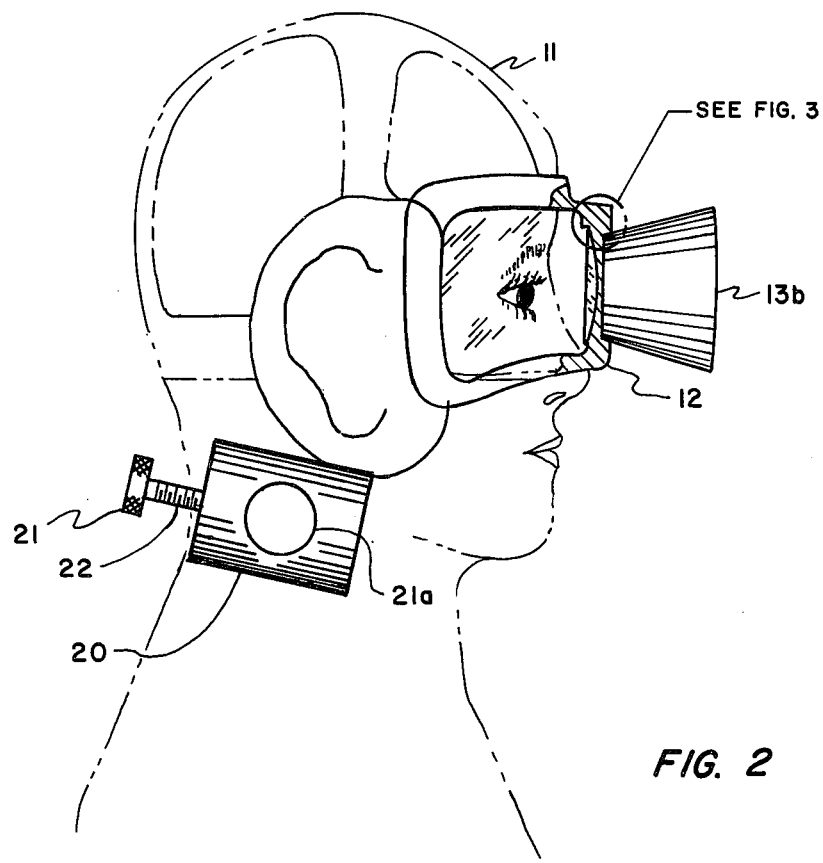
FIG. 2 shows a partial side view of the invention.

FIG. 2 shows a side view, partially in section, of the helmet liner free of the outer shell, but shows support 20 for end 13a of the HMD. This support is carried on shell 10 and is pivotable about center 21a. Adjusting knob 21 is fixed to screw 22 screwed into a hole in one end of support 20.

Figure 3:
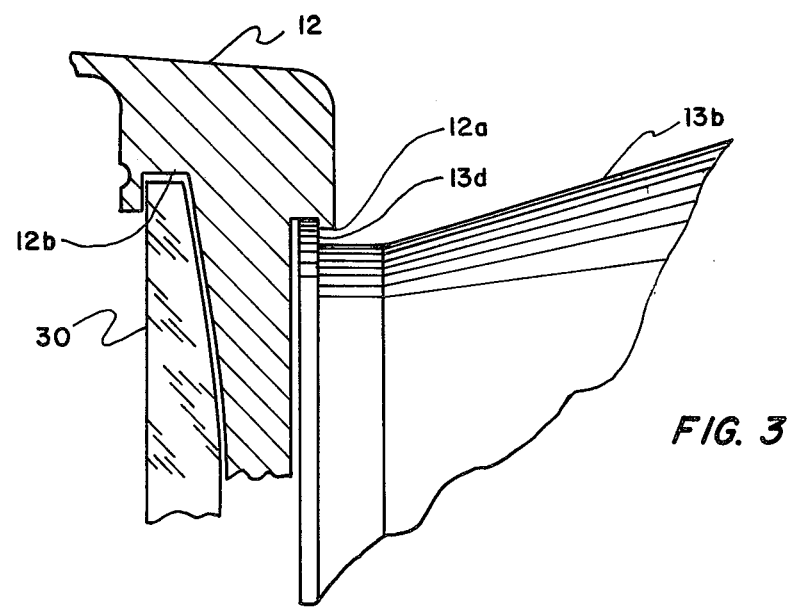
FIG. 3 shows a detail view of a portion of FIG. 2.

The mounting of ocular end 13b of the HMD may be seen in the detail of FIG. 3, wherein 13b includes flange 13d snapped into a groove in 12 as defined by flange 12a. Mask 12 is made of an optical grade of flexible plastic and may include groove 12b for prescription lens 30, if needed for the particular person for whom the liner is fitted.

Figure 4:
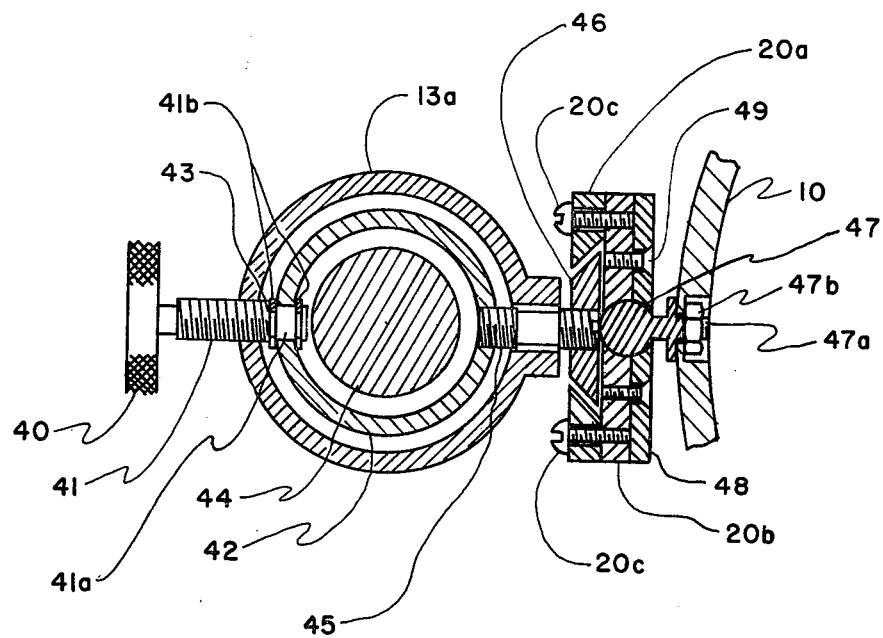
FIG. 4 is a section view in direction 4—4 on FIG. 1 showing details of the helmet-mounted display support of the invention.

FIG. 4 shows a section of the mounting and locking means for end 13a of HMD 13. This means includes knob 40 affixed to screw 41 in a tapped hole in 13a. This screw 41 has a smooth portion 41a inserted into a hole drilled in ring 42. This smooth portion has grooves 41b, with snap rings (or equivalent) 43 in the grooves. Within ring 42 is the display tube 44 of the HMD. The opposite side of ring 42 has shaft 45 screwed into a hole tapped in 42. The other end of 45 is screwed into dovetail 46. As can be seen, dovetail 46 fits into a dovetail slot in mount 20. This mount consists of portions 20a and 20b and is mounted on ball 47 held in a ball socket in 20 by plate 48. Screws 49 hold plate 48 onto mount 20. Ball 47 is mounted on shaft 47a inserted into a hole in shell 10 and held by nut 47b. Dovetail 46 may be adjusted relative to ball 47 by loosening screws 20c holding portion 20b and relatively shifting 20a and 20b. Adjusting knob 21 of FIG. 2 may be rotated to thread screw 22 back and forth in its hole to adjust dovetail 46 in its slot. Although we have described a dovetail and dovetail slot combination, obviously other shapes of mortises and tenons may be used.

Figure 5:
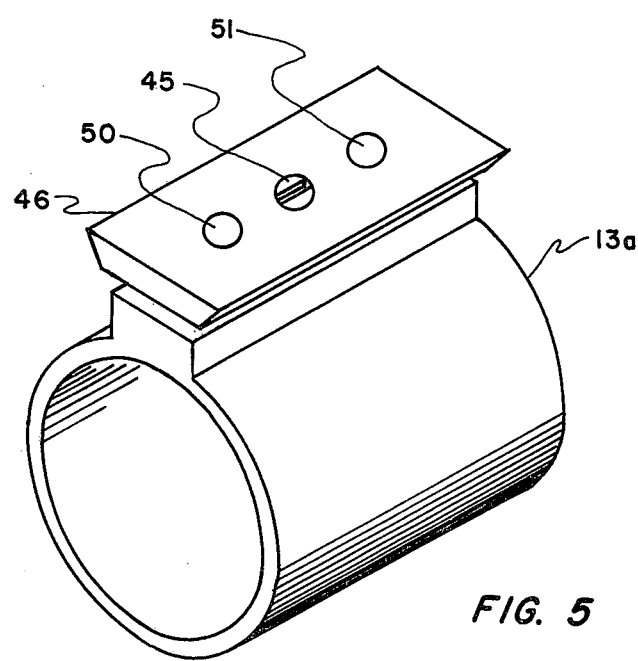
FIG. 5 shows a pictoral view of a portion view of the helmet-mounted display and its support.

FIG. 5 shows some of the details of the mounting of dovetail 46 on 13a. As can be seen, dovetail 46 has guide pins 50 and 51 therethrough, into 13a.

While a specific embodiment of the invention has been shown and described, other embodiments within the scope of our invention may be obvious to ones skilled in the art. For example, the mount for the HMD onto the helmet outer shell may be any type of adjustable, quick-tighten, quick-disconnect mount.

We claim:

1. A helmet system for carrying helmet mounted display means having a support end and an ocular end, said system including: a form-fit helmet liner having a face mask integral therewith, wherein said mask has a connector for said ocular end of said display means; and a helmet outer shell having an engagable mount for said support end of said display means.

2. The system as defined in claim 1 wherein said mount includes a pivotable portion between said shell and said display means.

3. The system as defined in claim 2 wherein said mount includes a portion for providing adjustment of said display means with respect to said shell.

4. The system as defined in claim 3 wherein said ocular end of said display means ends in a flange, and wherein said mask has a groove therein into which said flange may be inserted.

5. The system as defined in claim 4 wherein said pivotable portion includes a mortise and tenon connection.

6. The system as defined in claim 5 wherein said means for providing adjustment includes means for moving said mortise longitudinally in said tenon and further includes means for adjusting said pivotable portion with respect to said shell.

7. The system as defined in claim 6 further including means for locking together said mortise and said tenon.

* * * * *